United States Patent
Konishi

(10) Patent No.: US 11,731,856 B2
(45) Date of Patent: Aug. 22, 2023

(54) MONITORING APPARATUS

(71) Applicant: MITSUBISHI ELECTRIC CORPORATION, Chiyoda-ku (JP)

(72) Inventor: Yoshiki Konishi, Chiyoda-ku (JP)

(73) Assignee: MITSUBISHI ELECTRIC CORPORATION, Chiyoda-ku (JP)

(*) Notice: Subject to any disclaimer, the term of this patent is extended or adjusted under 35 U.S.C. 154(b) by 1211 days.

(21) Appl. No.: 16/099,776

(22) PCT Filed: Jun. 8, 2016

(86) PCT No.: PCT/JP2016/067050
§ 371 (c)(1),
(2) Date: Nov. 8, 2018

(87) PCT Pub. No.: WO2017/212568
PCT Pub. Date: Dec. 14, 2017

(65) Prior Publication Data
US 2019/0177119 A1     Jun. 13, 2019

(51) Int. Cl.
*B66B 3/02*     (2006.01)
*H04N 7/18*     (2006.01)
(Continued)

(52) U.S. Cl.
CPC .............. *B66B 3/02* (2013.01); *B66B 1/3476* (2013.01); *B66B 5/0006* (2013.01); *B66B 11/02* (2013.01);
(Continued)

(58) Field of Classification Search
CPC .............. G06T 7/194; G06T 7/00; H04N 7/18
See application file for complete search history.

(56) References Cited

U.S. PATENT DOCUMENTS

| | | | |
|---|---|---|---|
| 9,230,250 B1* | 1/2016 | Parker | G06V 20/41 |
| 2005/0169367 A1 | 8/2005 | Venetianer et al. | |
| 2018/0259215 A1* | 9/2018 | Zhao | F24F 11/62 |

FOREIGN PATENT DOCUMENTS

| | | |
|---|---|---|
| CN | 102509083 A | 6/2012 |
| CN | 105391990 A | 3/2016 |

(Continued)

OTHER PUBLICATIONS

Combined Chinese Office Action and Search Report dated Mar. 26, 2020 in corresponding Chinese Patent Application No. 201680086305.6 (with English Translation and English Translation of Category of Cited Documents), 14 pages.

(Continued)

*Primary Examiner* — Kyle M Lotfi
(74) *Attorney, Agent, or Firm* — Oblon, McClelland, Maier & Neustadt, L.L.P.

(57) ABSTRACT

A monitoring apparatus includes: a monitoring camera to monitor a situation of a specific area; a recorder to record monitoring information output from the monitoring camera; a video transmission device to transmit the monitoring information recorded in the recorder to the outside; a determination unit to calculate, based on the monitoring information output from the monitoring camera, the number of people present in the specific area and a degree of positional imbalance of the people; and an adjustment unit to adjust, based on the number of people and the degree of positional imbalance calculated by the determination unit, at least one of a recording density to be used when the recorder records the monitoring information or a communication frequency to be used when the video transmission device transmits the monitoring information.

9 Claims, 9 Drawing Sheets

(51) Int. Cl.
    *G08B 25/04* (2006.01)
    *B66B 1/34* (2006.01)
    *B66B 11/02* (2006.01)
    *B66B 5/00* (2006.01)

(52) U.S. Cl.
    CPC .............. *G08B 25/04* (2013.01); *H04N 7/18* (2013.01); *H04N 7/181* (2013.01)

(56) References Cited

FOREIGN PATENT DOCUMENTS

| | | | |
|---|---|---|---|
| JP | 2000-143128 A | | 5/2000 |
| JP | 2006276969 A | * | 10/2006 |
| JP | 2007-131382 A | | 5/2007 |
| JP | 2007-157203 A | | 6/2007 |
| JP | 2010-113494 A | | 5/2010 |
| JP | 4663756 B2 | | 4/2011 |

OTHER PUBLICATIONS

International Search Report dated Aug. 30, 2016 in PCT/JP2016/067050 filed on Jun. 8, 2016.
Sumi et. al., "Video Analysis Technology for Elevator Cage Abnormality Detection", IPSJ Magazine, Jan. 2007, vol. 48, No. 1, pp. 17-22.
Uchidate et. al., "Counting People and Recognition Wheelchairs at Elevator Lobby by Real-Time Image Processing", Technical Meeting on Industrial Instrumentation and Control, 2008 (86), IIC-08-88, pp. 1-6.

* cited by examiner

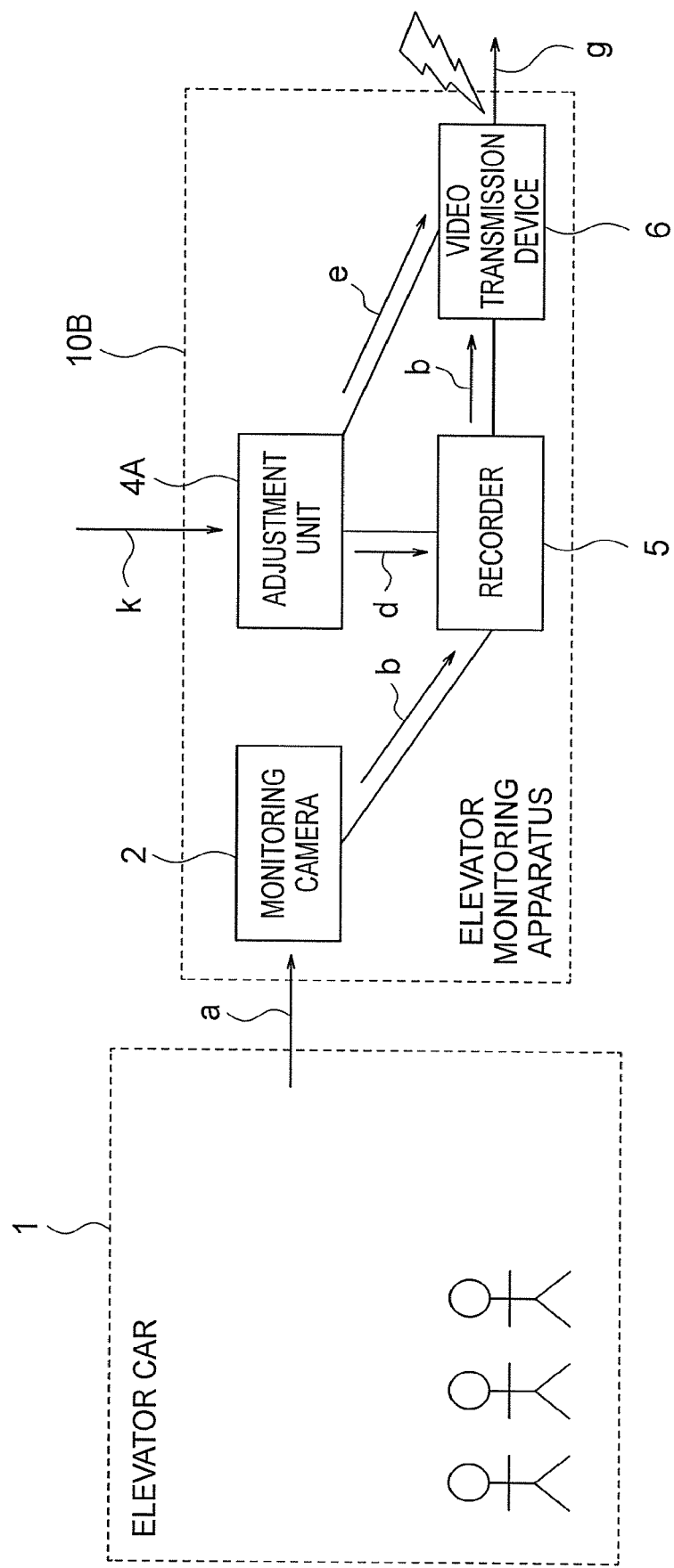

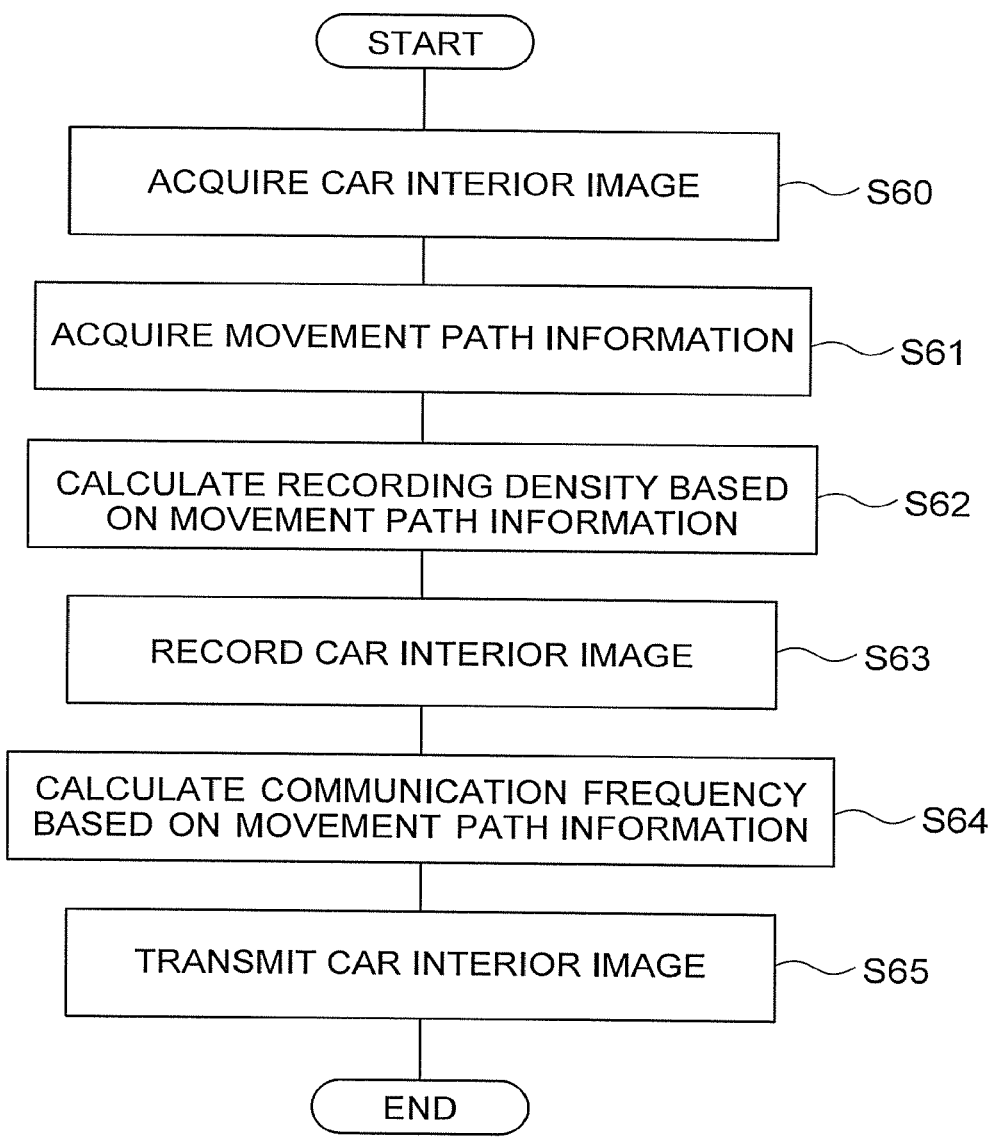

MONITORING APPARATUS

TECHNICAL FIELD

The present invention relates to a monitoring apparatus.

BACKGROUND ART

In many cases, a monitoring apparatus configured to monitor a specific space performs both of recording of a monitoring camera image or other information to a recorder or other local devices, and transmission of the information to the outside. Examples of the specific space include an elevator, a vehicle, and an office room of a company.

The recording of the information to the local device has a limitation in amount of information that can be recorded in one device. Therefore, reduction in amount of data to be recorded has been a subject.

Further, when the information is transmitted to the outside, the cost required for communication increases in proportion to the amount of data to be transmitted, and hence reduction in amount of transmission data has been a subject.

As the related art for reducing the transmission data, there has been proposed a technology of reducing the amount of data to be recorded by recording an image of a monitoring camera only when a passenger is present in a car of an elevator (for example, see Patent Literature 1).

Further, there has been proposed a monitoring apparatus configured to output a notification to a monitor when an abnormal behavior of a passenger of an elevator is detected (for example, see Patent Literature 2). In Patent Literature 2, an abnormality determination item is changed depending on the number of passengers. When the number of passengers is 1, falling determination of determining whether or not the passenger has fallen down is performed, and when the number of passengers is from 2 to 3, violation determination of determining whether or not a violation action has occurred is performed. However, Patent Literature 2 has a configuration in which neither of the tumble determination nor the violation determination is performed when the number of passengers is 4 or more.

CITATION LIST

Patent Literature

[PTL 1] JP 2000-143128 A
[PTL 1] JP 2007-131382 A

Non Patent Literature

[NPL 1] Kazuhiko Sumi and two others, "Video Analysis Technology for Elevator Cage Abnormality Detection", IPSJ Magazine, January 2007, Vol. 48, No. 1, p. 17-22
[NPL 2] Hikaru Uchidate and three others, "Counting People and Recognizing Wheelchairs at Elevator Lobby by Real-Time Image Processing", Technical Meeting on Industrial Instrumentation and Control, 2008(86), IIC-08-88, p. 1-6

SUMMARY OF INVENTION

Technical Problem

In Patent Literature 1, the amount of data to be recorded is reduced by recording the image of the monitoring camera only when a passenger is present in the car of the elevator. In Patent Literature 1, no consideration is given to transmission to the outside, but when a case in which the image of the monitoring camera is transmitted to the outside is considered, the amount of data is further required to be reduced in order to suppress the communication cost.

In Patent Literature 2, it is proposed that the abnormality determination item is changed depending on the number of passengers. In Patent Literature 2, it is determined that a possibility that a dangerous phenomenon may occur is low when the number of passengers in the car is large. However, even when the number of passengers in the car is large, in a case where those passengers are concentrated in one place, a dangerous action may be performed by a conspiring group. Patent Literature 2 has a problem in that an abnormal behavior of four or more passengers cannot be detected.

The present invention has been made to solve the above-mentioned problems, and has an object to provide a monitoring apparatus capable of further reducing an amount of data while appropriately determining a possibility of occurrence of an abnormal behavior even in both cases of small and large number of passengers.

Solution to Problem

According to one embodiment of the present invention, there is provided a monitoring apparatus including: a first detection device configured to monitor a situation of a specific area; a first recording device configured to record monitoring information to be output from the first detection device; a first communication device configured to transmit the monitoring information recorded in the first recording device to an outside; a first determination unit configured to calculate a number of people present in the specific area and a degree of positional imbalance of the people based on the monitoring information to be output from the first detection device; and a first adjustment unit configured to adjust, based on the number of people and the degree of positional imbalance that are calculated by the first determination unit, at least one of a recording density to be used when the first recording device records the monitoring information or a communication frequency to be used when the first communication device transmits the monitoring information.

Advantageous Effects of Invention

According to the monitoring apparatus of one embodiment of the present invention, in accordance with the number of people present in the space and the positional imbalance of the people, the possibility of the occurrence of the abnormal behavior is appropriately determined in both cases of small and large number of passengers, and an image quality and a transmission frequency are suppressed for information having low importance while recording with high image quality and transmission with high frequency are performed for information having high importance. Thus, the amount of data can be further reduced.

BRIEF DESCRIPTION OF DRAWINGS

FIG. 10 is a block diagram for illustrating a configuration of a monitoring apparatus according to Embodiment 3 of the present invention.

FIG. 11 is a flow chart for illustrating an operation of the monitoring apparatus according to Embodiment 3 of the present invention.

DESCRIPTION OF EMBODIMENTS

Now, Embodiments of the present invention are described with reference to the drawings.

In Embodiments of the present invention, a monitoring apparatus configured to monitor a specific area is described. In the monitoring apparatus according to Embodiments of the present invention, the following technology is proposed. That is, when the number of people in a space to be monitored is small, or when the number of people is large and a positional imbalance among the people is large, it is determined that a possibility of occurrence of a dangerous phenomenon in the space is high, and a recording density and a communication frequency of information are increased. Otherwise, the recording density and the communication frequency of the information are decreased. Examples of the dangerous phenomenon include breakage of facilities by humans and troubles among people.

In this manner, the amount of recording data and the amount of communication data can be adjusted in accordance with the possibility of the occurrence of the dangerous phenomenon in the space. Therefore, the recording density and the communication frequency of the information can be decreased when the possibility of the occurrence of the dangerous phenomenon in the space is low, and thus the amount of recording data and the amount of communication data can be further reduced.

Embodiment 1

Figure 1:
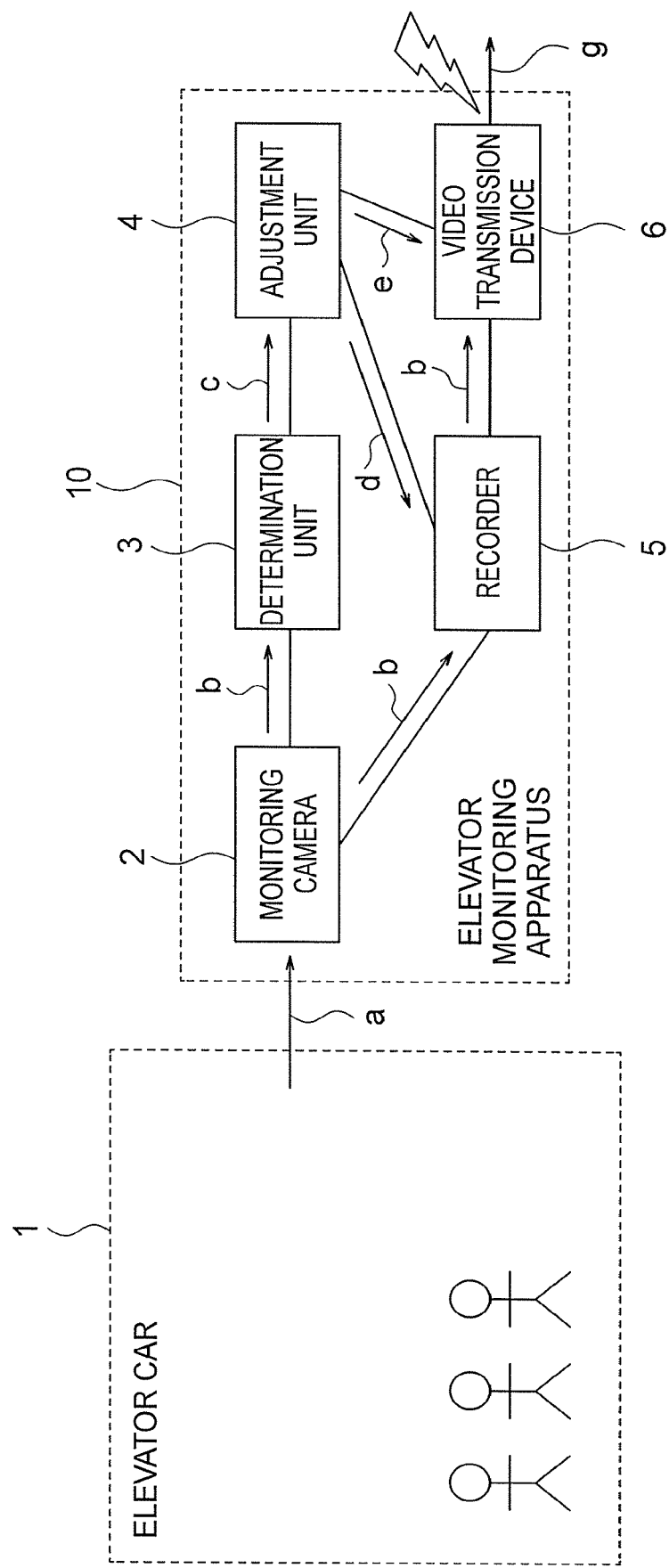
FIG. 1 is a block diagram for illustrating a configuration of a monitoring apparatus according to Embodiment 1 of the present invention.

FIG. 1 is a diagram for illustrating a monitoring apparatus according to Embodiment 1 of the present invention, and an object to be monitored by the monitoring apparatus. In Embodiment 1, as illustrated in FIG. 1, an elevator monitoring apparatus 10 is given as an example of the monitoring apparatus. Further, as an example of the object to be monitored, a space in an elevator car 1 is given.

As illustrated in FIG. 1, the elevator monitoring apparatus 10 includes a monitoring camera 2, a determination unit 3, an adjustment unit 4, a recorder 5, and a video transmission device 6.

The monitoring camera 2 is provided in the elevator car 1. The monitoring camera 2 takes an image of the interior of the elevator car 1 to acquire a car interior image a, and outputs car interior image data b to the determination unit 3 and the recorder 5. In this manner, in Embodiment 1, the monitoring camera 2 serves as a detection device configured to monitor a situation of a specific area, and the car interior image data b to be output from the monitoring camera 2 serves as monitoring information to be output from the detection device.

The determination unit 3 receives the car interior image data b from the monitoring camera 2. The determination unit 3 calculates, based on the car interior image data b, the number of passengers in the elevator car 1 and a degree of positional imbalance of the passengers in the elevator car 1 to output the results as a determination result c. The method of calculating the number of passengers and the degree of positional imbalance is described later.

The adjustment unit 4 determines, based on the determination result c, an image quality and a frame rate to be used when the recorder 5 records the car interior image data b, and outputs the results as a recording density d to the recorder 5. Therefore, the recording density d includes the image quality and the frame rate. Further, the adjustment unit 4 determines, based on the determination result c, an image quality and a transmission frequency or a transmission interval to be used when the video transmission device 6 transmits the car interior image data b recorded in the recorder 5 to the outside, and outputs the results as a communication frequency e to the video transmission device 6. Therefore, the communication frequency e includes the image quality and the transmission frequency or the transmission interval.

The recorder 5 records the car interior image data b acquired from the monitoring camera 2. In the recorder 5, the image quality and the frame rate to be used when the image is recorded can be changed. Therefore, the recorder 5 sets the values of the image quality and the frame rate based on the recording density d output from the adjustment unit 4 to record the car interior image data b.

The video transmission device 6 acquires the car interior image data b from the recorder 5 to transmit the car interior image data b to the outside, for example, a monitoring center. In the video transmission device 6, the image quality and the transmission frequency or the transmission interval to be used when the image is transmitted to the outside can be changed. Therefore, the video transmission device 6 sets the values of the image quality and the transmission frequency or the transmission interval based on the communication frequency e output from the adjustment unit 4 to transmit the car interior image data b.

Now, a hardware configuration of the monitoring apparatus 10 is described. The monitoring apparatus 10 includes a camera, a processor, a memory, and a transmission device. The monitoring camera 2 is formed of the camera, for example, a video camera. The video transmission device 6 is formed of the transmission device. The transmission device includes a transmission interface, a transmission circuit, and a transmission antenna. The recorder 5 is formed of the memory. The memory includes a read only memory (ROM) and a random access memory (RAM). The determination unit 3 and the adjustment unit 4 are formed of the processor and the memory. The determination unit 3 and the adjustment unit 4 are implemented by the processor executing a program stored in the memory. Further, a plurality of processors and a plurality of memories may cooperate with each other to implement the functions of the determination unit 3 and the adjustment unit 4.

Figure 2:
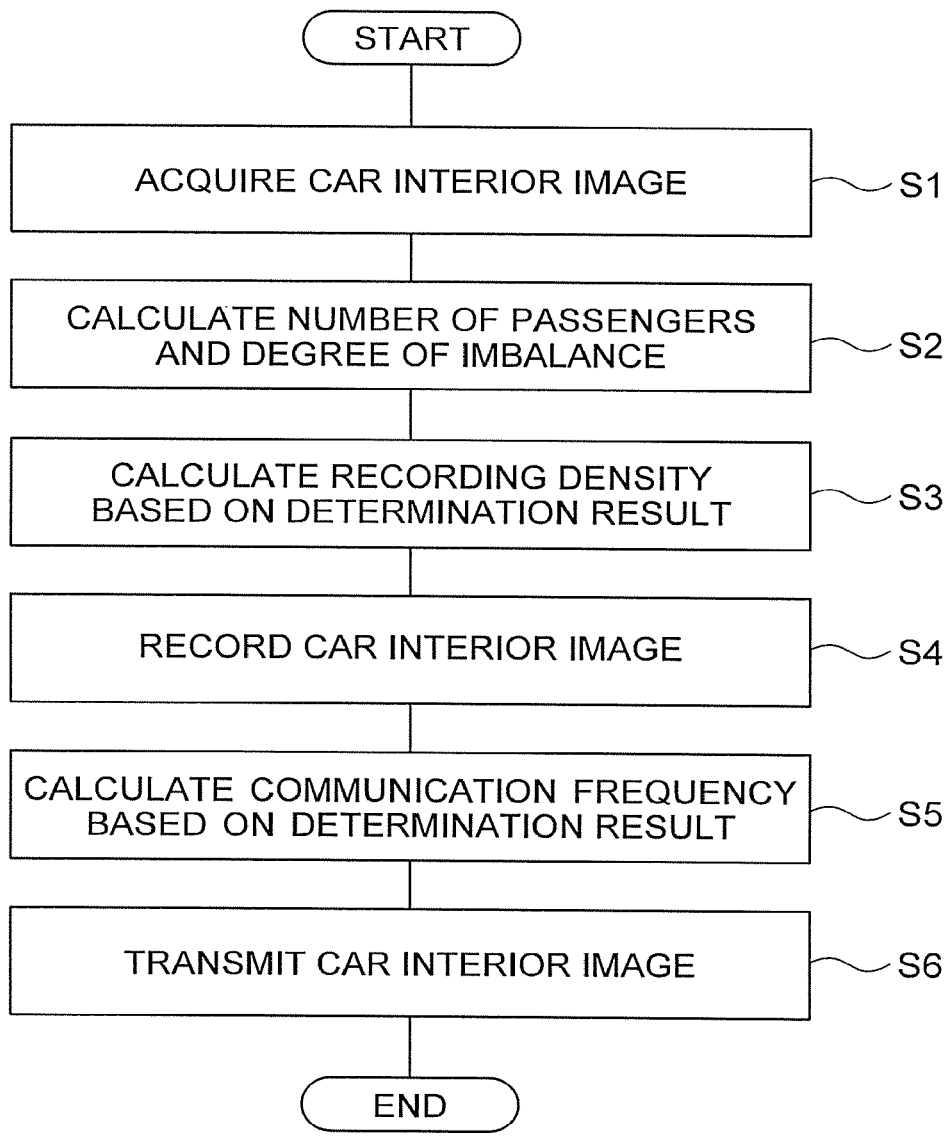
FIG. 2 is a flow chart for illustrating an operation of the monitoring apparatus according to Embodiment 1 of the present invention.

Next, an operation of the monitoring apparatus 10 according to Embodiment 1 of the present invention is described. FIG. 2 is a flow chart for illustrating the operation of the monitoring apparatus 10.

As illustrated in FIG. 2, first, the monitoring camera 2 takes an image of the interior of the elevator car 1 to acquire the car interior image a, and outputs the result as the car interior image data b to the determination unit 3 and the recorder 5 (Step S1).

Next, the determination unit 3 receives the car interior image data b from the monitoring camera 2, and calculates, based on the car interior image data b, the number of passengers in the elevator car 1 and the degree of positional imbalance of the passengers in the elevator car 1 to output the results as the determination result c. The method of calculating the number of passengers and the degree of positional imbalance of the passengers is described later (Step S2).

Next, the adjustment unit 4 determines, based on the determination result c output from the determination unit 3, the image quality and the frame rate to be used when the recorder 5 records the car interior image data b, and outputs the results as the recording density d to the recorder 5 (Step S3).

Next, the recorder 5 sets the values of the image quality and the frame rate based on the recording density d to record the car interior image data b acquired by the monitoring camera (Step S4).

Next, the adjustment unit 4 determines, based on the determination result c, the image quality and the transmission frequency to be used when the video transmission device 6 transmits the car interior image data b to the outside, and outputs the results as the communication frequency e to the video transmission device 6 (Step S5).

Next, the video transmission device 6 sets the image quality and the transmission frequency based on the communication frequency e, and acquires the car interior image data b from the recorder 5 to transmit the car interior image data b to the outside, for example, the monitoring center (Step S6).

As described above, the monitoring apparatus according to Embodiment 1 of the present invention adjusts the recording density d and the communication frequency e of the car interior image data b acquired by the monitoring camera 2 in accordance with the number of people present in the space to be monitored and the positional imbalance of the people.

In Embodiment 1, in Step S3 described above, when the number of passengers in the elevator car 1 is smaller than a first threshold value, that is, when the number of passengers is, for example, 2 or less, the adjustment unit 4 determines that a possibility that a dangerous phenomenon may occur is high, that is, the importance is high, and determines to set the image quality and the frame rate to be used when the car interior image data is recorded to a "high level". Further, when the number of passengers in the elevator car 1 is equal to or larger than a second threshold value, that is, when the number of passengers is, for example, 3 or more, and when the degree of positional imbalance of the passengers in the elevator car 1 is equal to or larger than a third threshold value, that is, when the passengers are concentrated in one place, the adjustment unit 4 determines that the possibility that a dangerous phenomenon may occur is high, that is, the importance is high, and determines to set the image quality and the frame rate to be used when the car interior image data is recorded to the "high level". As described above, in Embodiment 1, the adjustment unit 4 determines to set the recording density d to the "high level" for car interior image data having high possibility that a dangerous phenomenon may occur, that is, having high importance.

Meanwhile, when the number of passengers in the elevator car 1 is equal to or larger than the second threshold value, that is, when the number of passengers is 3 or more, and when the degree of positional imbalance of the passengers in the elevator car 1 is less than the third threshold value, that is, when the positions of the passengers in the elevator car 1 are not concentrated in one place, it is determined that the possibility that a dangerous phenomenon may occur is low, that is, the importance is low, and the adjustment unit 4 determines to set the recording density d to a "low level".

The values of the image quality and the frame rate of the recording density d are set in advance for each of the cases of the "high level" and the "low level", and are stored in the memory.

As described above, the limited recording capacity of the recorder 5 can be effectively utilized by changing the image quality and the frame rate depending on the importance. Each of the image quality and the frame rate may be changed at two stages of the "high level" and the "low level", or the importance may be ranked so that the change may be performed at a plurality of stages depending on the rank. When the importance is ranked, the importance may be set in advance for each level of number of passengers and each level of positional imbalance of the passengers, and further a look-up table in which a correspondence between the importance and the recording density d is defined in advance may be prepared so that the corresponding recording density d may be acquired from the look-up table based on the importance.

Further, in Embodiment 1, in Step S5 described above, when the number of passengers in the elevator car 1 is small, that is, when the number of passengers is 2 or less, the adjustment unit 4 determines that the possibility that a dangerous phenomenon may occur is high, that is, the importance is high, and determines to set the image quality and the transmission frequency to be used when the car interior image data is transmitted to the outside to the "high level". Further, when the number of passengers in the elevator car 1 is 3 or more and when the positions of the passengers in the elevator car 1 are concentrated, the adjustment unit 4 determines that the possibility that a dangerous phenomenon may occur is high, that is, the importance is high, and determines to set the image quality and the transmission frequency to be used when the car interior image data is transmitted to the outside to the "high level". Otherwise, the adjustment unit 4 determines to set the image quality and the transmission frequency to the "low level". As described above, in Embodiment 1, the car interior image data having a high possibility that a dangerous phenomenon may occur, that is, having high importance, is transmitted at a high image quality and a high transmission frequency, but the car interior image data having a low possibility that a dangerous phenomenon may occur, that is, having low importance, is transmitted with the image quality and the transmission frequency at the "low level". As described above, the image quality and the transmission frequency are changed depending on the importance, and thus the entire amount of data to be transmitted to the outside can be reduced, and the communication cost can be decreased.

The values of the image quality and the transmission frequency of the communication frequency e are set in advance for each of the cases of the "high level" and the "low level", and are stored in the memory.

Further, each of the image quality and the transmission frequency may be changed at two stages of the "high level" and the "low level", or the importance may be ranked so that the change may be performed at a plurality of stages depending on the rank. When the importance is ranked, the importance may be set in advance for each number of passengers and each positional imbalance of the passengers, and further a look-up table in which a correspondence between the importance and the communication frequency e is defined in advance may be prepared so that the corresponding communication frequency e may be acquired from the look-up table based on the importance.

As described above, in Embodiment 1, the importance of the car interior image data is increased not only when the number of passengers in the elevator car 1 is 2 or less, but also when the number of passengers in the elevator car 1 is 3 or more and when the positions of the passengers in the elevator car 1 are concentrated. The reason is as follows. In general, when the number of passengers in the elevator car is large, it is determined that the possibility that a dangerous phenomenon may occur is low because of the view from other people. However, even when the number of passengers in the elevator car is large, in a case where those passengers are concentrated in one place, a dangerous action may be performed by a conspiring group. In view of this, in Embodiment 1, in consideration of the positional imbalance of the passengers in the elevator car, the detection of the abnormal behavior is enabled even when the number of passengers is large.

Figure 3:
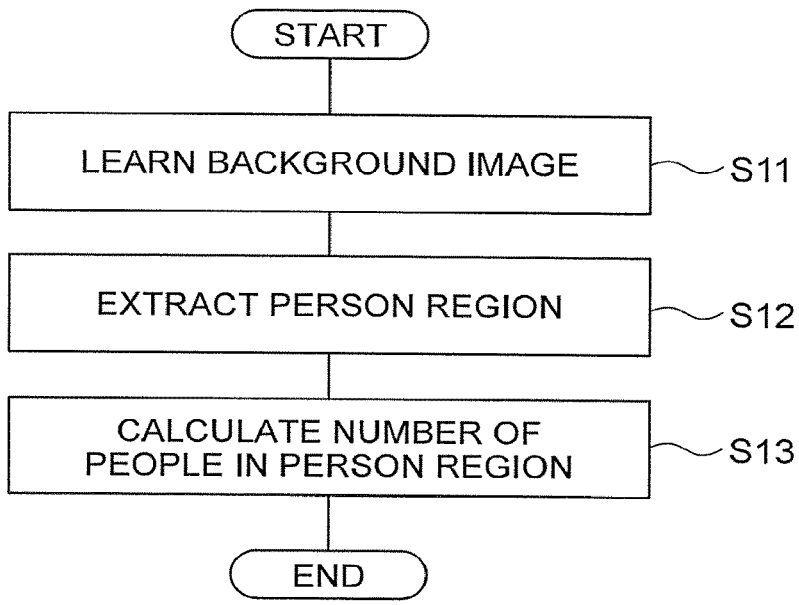
FIG. 3 is a flow chart for illustrating an operation of the monitoring apparatus according to Embodiment 1 of the present invention.

Next, description is given of a method of calculating, by the determination unit 3, the number of passengers based on the car interior image data b in Step S2 described above. The calculation is performed as follows, for example. The flow is illustrated in FIG. 3.

First, in Step S11, when the elevator monitoring apparatus 10 is installed, the determination unit 3 takes a background image in the elevator car 1 with use of the monitoring camera 2 under a state in which no person is present in the elevator car 1 to acquire a background image a0, and learns the background image a0 as background image data b0.

Then, in Step S12, while the elevator monitoring apparatus 10 is in operation, the interior of the elevator car 1 is photographed with use of the monitoring camera 2 so that the car interior image data b is acquired, and a difference between the car interior image data b and the background image data b0 is calculated so that a region in which a person is present is extracted based on the difference. In the following, this region is called "person region". As for the detection of the person region based on the difference, there is proposed a method described in Non Patent Literature 1. In Embodiment 1, for example, the method described in Non Patent Literature 1 is used, but the method is not limited thereto, and any existing method may be used.

Next, in Step S13, a head region present in the person region extracted in Step S12 is extracted so that the number of heads is counted as the number of people. In this manner, the number of passengers in the person region is calculated and output. As for the method of extracting the head region, there is proposed a method using contour information in Non Patent Literature 2. In Embodiment 1, for example, the method described in Non Patent Literature 2 is used, but the method is not limited thereto, and any existing method may be used.

Figure 4:
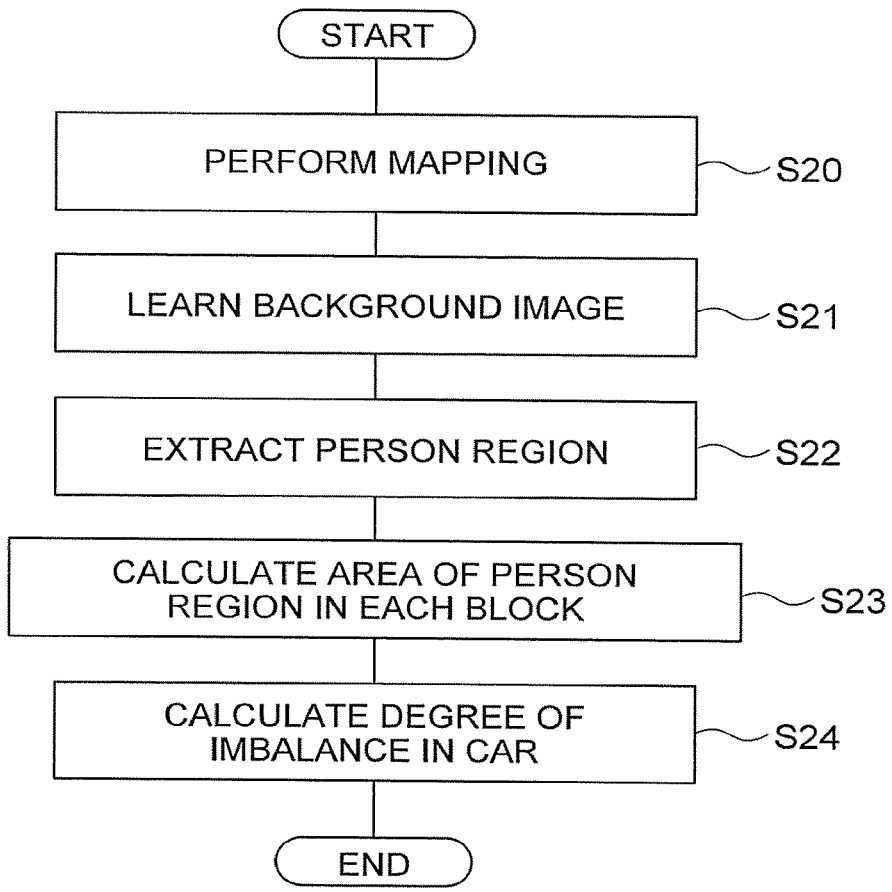
FIG. 4 is a flow chart for illustrating an operation of the monitoring apparatus according to Embodiment 1 of the present invention.

Next, description is given of the method of calculating, by the determination unit 3, the positional imbalance of the passengers in the elevator car 1 in Step S2 described above. The calculation is performed as follows, for example. The flow is illustrated in FIG. 4.

First, in Step S20, when the monitoring apparatus 10 is installed, the determination unit 3 executes mapping of two-dimensional coordinates of the car interior image and three-dimensional coordinates of the interior of the elevator car 1.

Next, in Step S21 and Step S22, the determination unit 3 performs processing similar to that performed in Step S11 and Step S12 in FIG. 3 to extract the person region based on the difference between the background image data b0 and the car interior image data b acquired by the monitoring camera 2.

Figure 5:
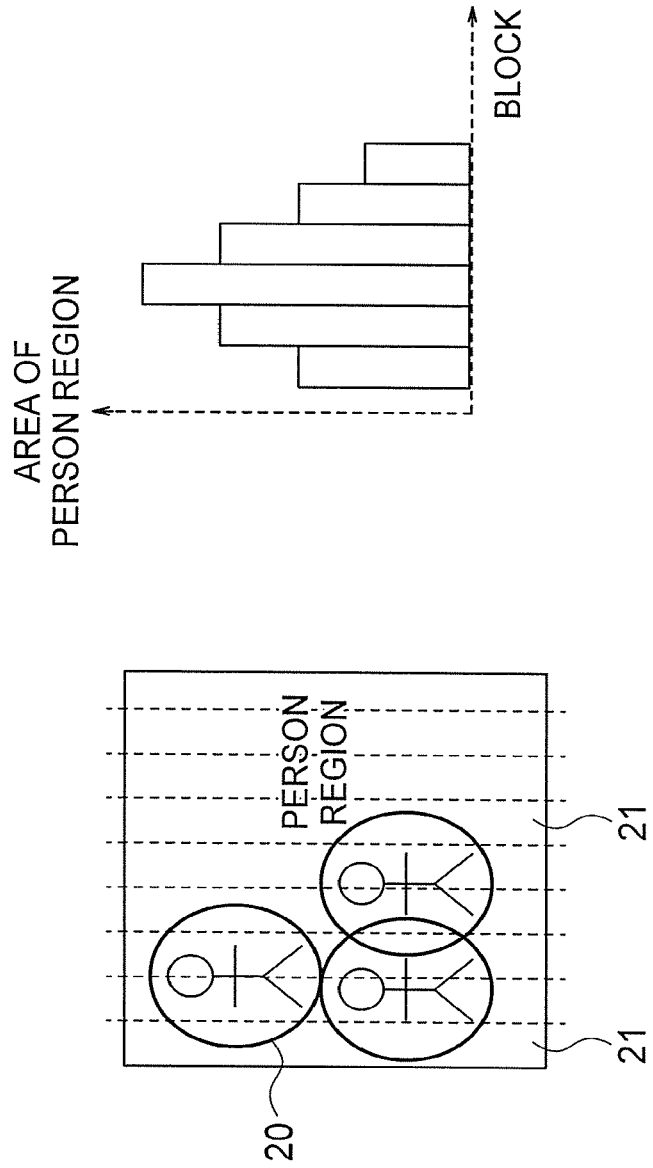
FIG. 5 are explanatory diagrams for illustrating an operation of the monitoring apparatus according to Embodiment 1 of the present invention.

Next, in Step S23, the determination unit 3 divides the interior of the elevator car 1 into a plurality of blocks as illustrated in FIG. 5 to calculate an area of the person region included in each block. FIG. 5A is a top view of the interior of the elevator car 1 as viewed from above. In FIG. 5A, person regions 20 and blocks 21 are illustrated. As described above, the interior of the elevator car 1 is divided into the plurality of blocks 21, and an area of the person regions 20 included in image data of each block 21 is calculated for each block 21. Results of the calculation are shown in the graph of FIG. 5B. The lateral axis represents each block 21, and the vertical axis represents the area of the person region 20 in each block 21. In the bar graph of FIG. 5B, as the block has a larger person region in area, people are more concentrated in the block.

Next, in Step S24, the determination unit 3 calculates a reciprocal ($1/\sigma^2$) of dispersion of each area obtained in Step S23 to output the reciprocal as the degree of positional imbalance.

As described above, the monitoring apparatus according to Embodiment 1 of the present invention adjusts the recording density d and the communication frequency e of the car interior image data b acquired by the monitoring camera 2 in accordance with the number of people present in the space to be monitored and the positional imbalance of the people. That is, the monitoring apparatus according to Embodiment 1 of the present invention determines the possibility that a dangerous phenomenon may occur to adjust the recording density d and the communication frequency e of image information in accordance with the possibility. In this manner, the image data having high importance is recorded at a high image quality and a high frame rate, and is transmitted at a high image quality and a high transmission frequency. Meanwhile, the image data having low importance is recorded at a low image quality and a low frame rate, and is transmitted at a low image quality and a low transmission frequency. In this manner, the image data having high importance can be ensured to be recorded and transmitted at a high quality. Further, for the image data having low importance, the recording density and the transmission frequency can be suppressed to be low, and thus the amount of data can be reduced as a whole. Further, in Embodiment 1, the possibility that a dangerous phenomenon may occur is determined in consideration of not only the number of passengers but also the positional imbalance of the passengers, and hence it is determined that the possibility that a dangerous phenomenon may occur in the space is high when the number of people present in the space to be monitored is small or when the positional imbalance of the people in the space is large. Therefore, an abnormal behavior of a case in which the number of people in the space is large, which has not been detected in Patent Literature 2 described above, can also be detected.

It is also possible to execute only one of the calculation of the recording density d in Step S3 described above and the calculation of the communication frequency e in Step S5 described above. For example, when the recorder 5 has a plenty of recording capacity, the recording density d may be always set to the constant "high level" or "standard level", and only the communication frequency e may be controlled in accordance with the output of the determination unit 3.

As described above, the monitoring apparatus 10 according to Embodiment 1 includes: the monitoring camera 2 serving as a first detection device configured to monitor a situation of a specific area; the recorder 5 serving as a first recording device configured to record monitoring information to be output from the first detection device; the video transmission device 6 serving as a first communication device configured to transmit the monitoring information recorded in the first recording device to the outside; the determination unit 3 serving as a first determination unit configured to calculate the number of people present in the specific area and the degree of positional imbalance of the people based on the monitoring information to be output from the first detection device; and the adjustment unit 4 serving as a first adjustment unit configured to adjust, based on the number of people and the degree of positional imbalance that are calculated by the first determination unit, at least one of the recording density to be used when the first recording device records the monitoring information or the communication frequency to be used when the first communication device transmits the monitoring information. In this manner, in any case of small or large number of passengers, the possibility of the occurrence of the abnormal behavior is appropriately determined in accordance with the number of people present in the space and the positional imbalance of the people. Information having low importance is suppressed in image quality and transmission frequency while information having high importance is recorded at a high image quality and transmitted at a high frequency. In this manner, the amount of data can be further reduced.

Embodiment 2

Figure 6:
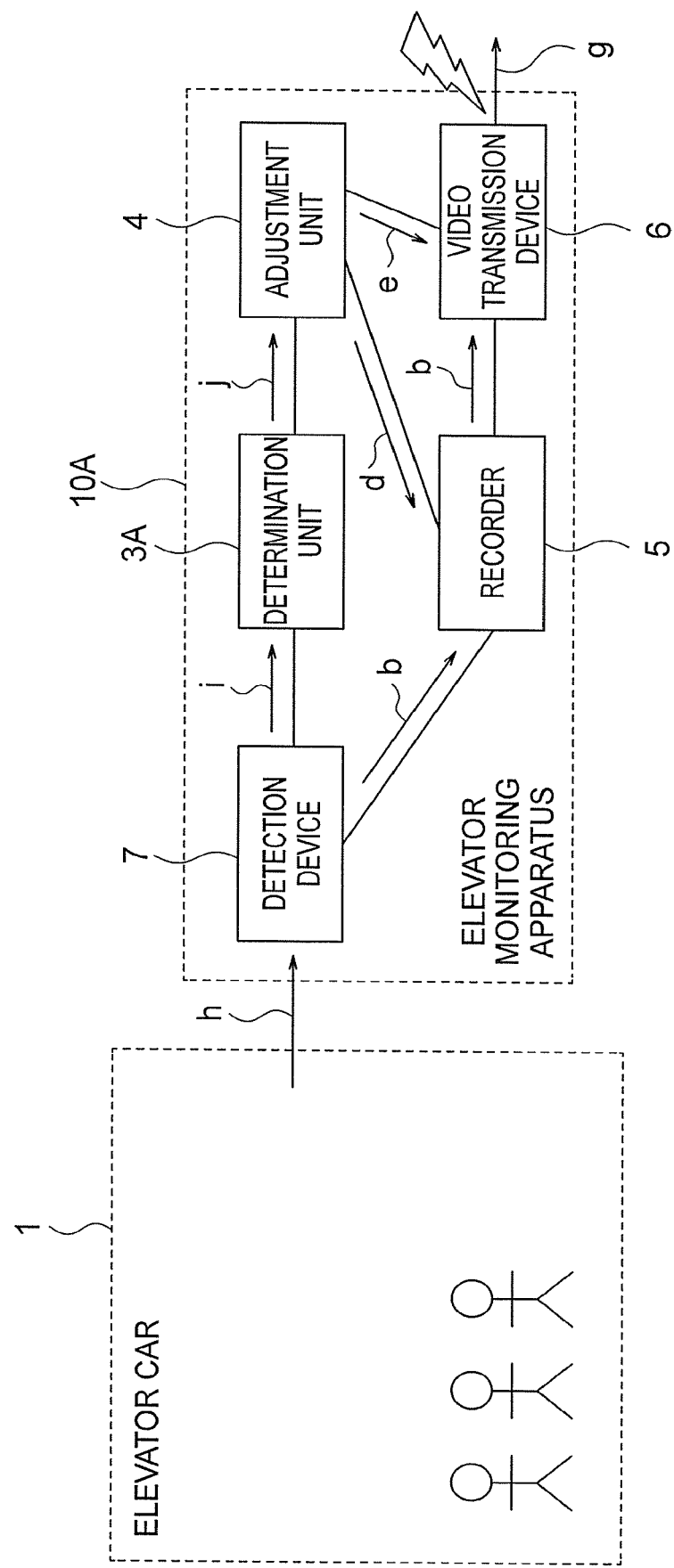
FIG. 6 is a block diagram for illustrating a configuration of a monitoring apparatus according to Embodiment 2 of the present invention.

FIG. 6 is a diagram for illustrating a monitoring apparatus according to Embodiment 2 of the present invention, and an object to be monitored by the monitoring apparatus. In FIG. 6, similarly to Embodiment 1, the elevator monitoring apparatus is given as an example of the monitoring apparatus, and as an example of the object to be monitored, the space in the elevator car 1 is given.

As illustrated in FIG. 6, the elevator monitoring apparatus 10A includes a detection device 7, a determination unit 3A, an adjustment unit 4, a recorder 5, and a video transmission device 6.

The difference between Embodiment 1 and Embodiment 2 is now described. In FIG. 6, the detection device 7 is provided instead of the monitoring camera 2 of FIG. 1. Further, in FIG. 6, the determination unit 3A is provided instead of the determination unit 3 of FIG. 1. The determination unit 3 and the determination unit 3A differ in operation.

The detection device 7 includes a monitoring camera and a load sensor. The monitoring camera of the detection device 7 is equivalent to the monitoring camera 2 of FIG. 1. Therefore, the monitoring camera of the detection device 7 takes an image of the interior of the elevator car 1 to output the car interior image data b similarly to the monitoring camera 2 of FIG. 1. The load sensor of the detection device 7 is provided in the elevator car 1. The load sensor is mounted to the entire floor surface of the elevator car 1. The load sensor detects the entire load in the elevator car 1. The detection device 7 outputs the car interior image data b taken by the monitoring camera to the recorder 5, and outputs load information i acquired by the load sensor to the determination unit 3A. As described above, in Embodiment 2, the monitoring information acquired by the detection device 7 includes the car interior image data b and the load information i.

The determination unit 3A receives the load information i to calculate the number of passengers in the elevator car 1 and the degree of positional imbalance of the passengers in the elevator car 1, and outputs the results as a determination result j. The method of calculating the number of passengers and the degree of positional imbalance is described later.

The configurations of the adjustment unit 4, the recorder 5, and the video transmission device 6 of the monitoring apparatus 10A are the same as those in Embodiment 1, and hence description thereof is omitted here.

Now, a hardware configuration of the monitoring apparatus 10A is described. The monitoring apparatus 10A includes a camera, a load sensor, a processor, a memory, and a transmission device. The detection device 7 is formed of the camera, for example, a video camera, and the load sensor. The video transmission device 6 is formed of the transmission device. The transmission device includes a transmission interface, a transmission circuit, and a transmission antenna. The recorder 5 is formed of the memory. The memory includes a read only memory (ROM) and a random access memory (RAM). The determination unit 3 and the adjustment unit 4 are formed of the processor and the memory. The determination unit 3A and the adjustment unit 4 are implemented by the processor executing a program stored in the memory. Further, a plurality of processors and a plurality of memories may cooperate with each other to implement the functions of the determination unit 3A and the adjustment unit 4.

Figure 7:
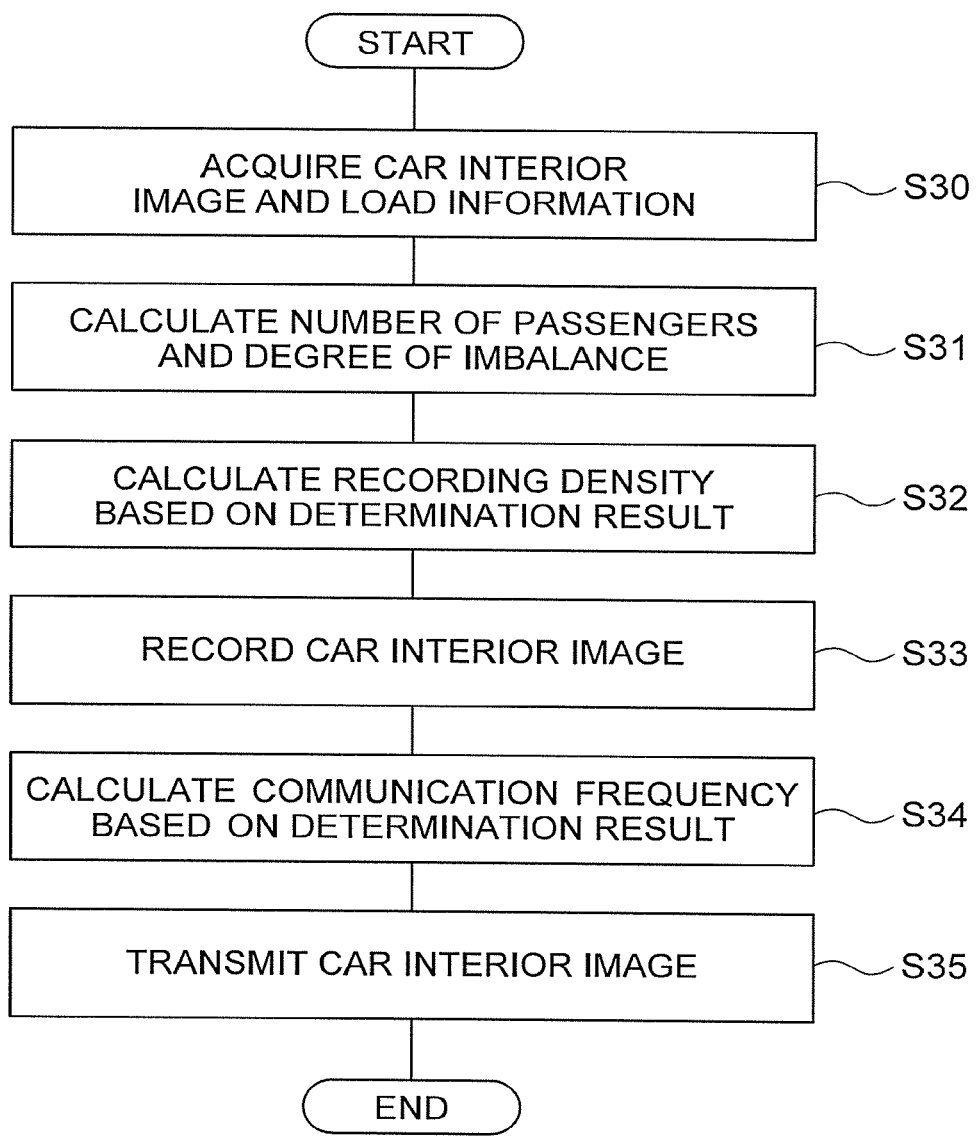
FIG. 7 is a flow chart for illustrating an operation of the monitoring apparatus according to Embodiment 2 of the present invention.

Next, an operation of the monitoring apparatus 10A according to Embodiment 1 of the present invention is described. FIG. 7 is a flow chart for illustrating the operation of the monitoring apparatus 10A.

As illustrated in FIG. 7, first, the detection device 7 uses the monitoring camera to take an image of the interior of the elevator car 1 to acquire the car interior image a, and outputs the car interior image data b to the recorder 5. Further, at the same time, the detection device 7 uses the load sensor to measure the load in the elevator car 1, and outputs the load information i to the determination unit 3A (Step S30).

Next, the determination unit 3A calculates, based on the load information i received from the detection device 7, the number of passengers in the elevator car 1 and the degree of positional imbalance of the passengers in the elevator car 1, and outputs the results as the determination result j (Step S31). The method of calculating the number of passengers and the degree of positional imbalance is described later.

Next, the adjustment unit 4 determines, based on the determination result j, the image quality and the frame rate to be used when the recorder 5 records the image in the elevator car 1, and outputs the results as the recording density d to the recorder 5 (Step S32). Also in Embodiment 2, similarly to Embodiment 1, when the number of people calculated by the determination unit 3A is equal to or smaller than the first threshold value, and when the number of people calculated by the determination unit 3A is equal to or larger than the second threshold value that is larger than the first threshold value and also the degree of positional imbalance of the passengers calculated by the determination unit 3A is equal to or larger than the third threshold value, the adjustment unit 4 determines to set the recording density d to the "high level", and otherwise, determines to set the recording density d to the "low level".

Next, the recorder 5 sets the image quality and the frame rate based on the recording density d to record the car interior image data b acquired by the monitoring camera 2 (Step S33).

Next, the adjustment unit 4 determines, based on the determination result j, the image quality and the transmission frequency to be used when the video transmission device 6 transmits the car interior image data b to the outside, and outputs the results as the communication frequency e to the video transmission device 6 (Step S34). Also in Embodiment 2, similarly to Embodiment 1, when the number of people calculated by the determination unit 3A is equal to or smaller than the first threshold value, and when the number of people calculated by the determination unit 3A is equal to or larger than the second threshold value that is larger than the first threshold value and also the degree of positional imbalance of the passengers calculated by the determination unit 3A is equal to or larger than the third threshold value, the adjustment unit 4 determines to set the communication frequency e to the "high level", and otherwise, determines to set the communication frequency e to the "low level".

Next, the video transmission device 6 sets the image quality and the transmission frequency based on the communication frequency e, and acquires the car interior image data b from the recorder 5 to transmit the car interior image data b to the outside, for example, the monitoring center (Step S35).

As described above, similarly to Embodiment 1, the monitoring apparatus according to Embodiment 2 of the present invention adjusts the recording density d and the communication frequency e of the car interior image data b in accordance with the number of people present in the space and the positional imbalance of the people.

Figure 8:
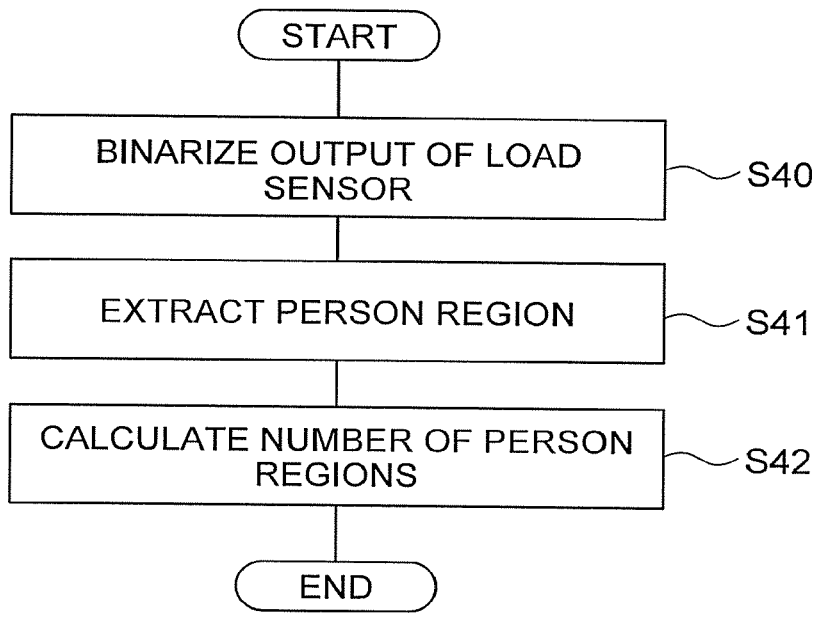
FIG. 8 is a flow chart for illustrating an operation of the monitoring apparatus according to Embodiment 2 of the present invention.

Next, description is given of a method of calculating, by the determination unit 3A, the number of passengers based on the load information i in Step S31 described above. The calculation is performed as follows, for example. The flow is illustrated in FIG. 8.

First, in Step S40, the determination unit 3A binarizes the load information output from the load sensor of the detection device 7 with use of a discrimination threshold value set in advance. That is, the load information is compared with the discrimination threshold value, and "1" is set when the load information is equal to or larger than the discrimination threshold value, and "0" is set when the load information is smaller than the discrimination threshold value. The discrimination threshold value is a value for determining the presence or absence of a passenger, and hence is set as appropriate in a range of from 5 kg to 15 kg.

Next, in Step S41, the determination unit 3A extracts the person region by performing region division processing, for example, morphology, on the binarized load information. The person region is equivalent to the person region 20 illustrated in FIG. 5A. Therefore, the person region is called the person region 20 in the following.

Next, in Step S42, the determination unit 3A counts the number of person regions to output the count value as the number of passengers.

Figure 9:
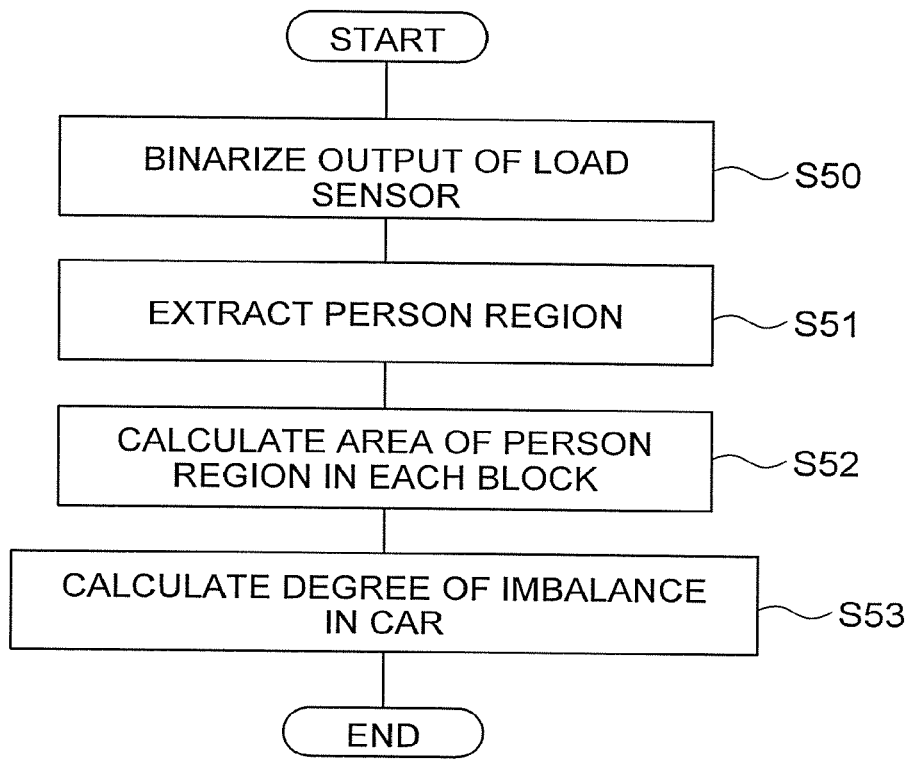
FIG. 9 is a flow chart for illustrating an operation of the monitoring apparatus according to Embodiment 2 of the present invention.

Next, description is given of the method of calculating, by the determination unit 3A, the positional imbalance of the passengers in the elevator car 1 in Step S31 described above. The calculation is performed as follows, for example. The flow is illustrated in FIG. 9.

First, in Step S50 and Step S51, the determination unit 3A performs processing similar to that in Step S40 and Step S41 of FIG. 8 to extract the person region 20.

Next, in Step S52, similarly to the processing in Step S23 of FIG. 4, as illustrated in FIG. 5A, the determination unit 3A divides the region of the interior of the elevator car 1 into the plurality of blocks 21, and calculates the area of the person region 20 included in each block 21. The calculated results are the results of the graph of FIG. 5B.

Next, in Step S53, the determination unit 3A calculates the reciprocal $(1/\sigma^2)$ of the dispersion of the above-mentioned area to output the reciprocal as the degree of imbalance.

As described above, the monitoring apparatus according to Embodiment 2 includes: the detection device 7 serving as a first detection device configured to monitor a situation of a specific area; the recorder 5 serving as a first recording device configured to record monitoring information to be output from the first detection device; the video transmission device 6 serving as a first communication device configured to transmit the monitoring information recorded in the first recording device to the outside; the determination unit 3A serving as a first determination unit configured to calculate the number of people present in the specific area and the degree of positional imbalance of the people based on the monitoring information to be output from the first detection device; and the adjustment unit 4 serving as a first adjustment unit configured to adjust, based on the number of people and the degree of positional imbalance that are calculated by the first determination unit, at least one of the recording density d to be used when the first recording device records the monitoring information or the communication frequency e to be used when the first communication device transmits the monitoring information. In this manner, similarly to Embodiment 1, the monitoring apparatus according to Embodiment 2 adjusts the recording density d and the communication frequency e of the car interior image data b acquired by the monitoring camera 2 in accordance with the number of people present in the space to be monitored and the positional imbalance of the people, and hence an effect similar to that in Embodiment 1 is obtained. Further, in Embodiment 2, the number of passengers and the degree of imbalance are calculated with use of the load information acquired by the load sensor, and hence a more robust operation is possible against the change in illumination in the elevator car 1 or the change in environment, for example, the position of the monitoring camera.

In Embodiment 1 and Embodiment 2 described above, description has been given of Example in which the monitoring apparatus is the "elevator monitoring apparatus" and the object to be monitored is the "space in the elevator car". In the following, description is given of other Examples of the monitoring apparatus according to Embodiment 1 and Embodiment 2 described above.

<Example of Car Monitoring Apparatus>

As other Example in Embodiment 1 and Embodiment 2 described above, there is conceivable Example in which the monitoring apparatus is a "car monitoring apparatus" of a train. In this Example, the object to be monitored is an "interior of the car of the train". In this Example, the car monitoring apparatus monitors the interior of the car of the train. In the "car monitoring apparatus", other configurations are similar to those of the elevator monitoring apparatus 10 and 10A. That is, the "car monitoring apparatus" includes the monitoring camera 2 or the detection device 7, the determination unit 3 or 3A, the adjustment unit 4, the recorder 5, and the video transmission device 6. Further, the operation in this Example is similar to those in the elevator monitoring apparatus 10 and 10A except that the object to be monitored is the "interior of the car of the train".

<Example of Indoor Monitoring Apparatus>

As other Example in Embodiment 1 and Embodiment 2 described above, there is conceivable Example in which the monitoring apparatus is an "indoor monitoring apparatus" configured to monitor an office room of a company. In this Example, the object to be monitored is an "interior of the office room of the company". In this Example, the indoor monitoring apparatus monitors the interior of the office room of the company. In the "indoor monitoring apparatus", other components are similar to those of the elevator monitoring apparatus 10 and 10A. That is, the "indoor monitoring apparatus" includes the monitoring camera 2 or the detection device 7, the determination unit 3 or 3A, the adjustment unit 4, the recorder 5, and the video transmission device 6. Further, the operation in this Example is similar to those in the elevator monitoring apparatus 10 and 10A except that the object to be monitored is the "interior of the office room of the company".

<Example 1 of Store Monitoring Apparatus>

As other Example in Embodiment 1 and Embodiment 2 described above, there is conceivable Example in which the monitoring apparatus is a "store monitoring apparatus" configured to monitor an interior of a store, for example, a convenience store. In this Example, the object to be monitored is an "interior of the store". In this Example, the store monitoring apparatus monitors the interior of the store. In the "store monitoring apparatus", other components are similar to those of the elevator monitoring apparatus 10 and 10A. That is, the "store monitoring apparatus" includes the monitoring camera 2 or the detection device 7, the determination unit 3 or 3A, the adjustment unit 4, the recorder 5, and the video transmission device 6. Further, the operation in this Example is similar to those in the elevator monitoring apparatus 10 and 10A except that the object to be monitored is the "interior of the store", for example, the convenience store.

<Example 2 of Store Monitoring Apparatus>

In this Example, the monitoring camera in the "store monitoring apparatus" includes a first monitoring camera configured to take an image of an interior of a selling area, and a second monitoring camera configured to take an image of a periphery of a cash register. In this Example, the object to be monitored is the "interior of the selling area" and the "periphery of the cash register". In this Example, the store monitoring apparatus monitors the interior of the selling area and the periphery of the cash register of the store. In the "store monitoring apparatus" according to this Example, other components are similar to those of the elevator monitoring apparatus 10 and 10A. That is, the "store monitoring apparatus" includes the monitoring camera 2 or the detection device 7, the determination unit 3 or 3A, the adjustment unit 4, the recorder 5, and the video transmission device 6. The monitoring camera 2 or the detection device 7 includes the first monitoring camera and the second monitoring camera. Further, the operation in this Example is basically similar to those in the elevator monitoring apparatus 10 and 10A except that the object to be monitored is the "interior of the selling area" and the "periphery of the cash register".

In this Example, however, the first monitoring camera and the second monitoring camera output selling area image data and cash register image data, respectively. The determination unit 3 or 3A calculates the number of people and the degree of imbalance in the selling area from the selling area image data to output the results to the adjustment unit 4. The operations of the adjustment unit 4, the recorder 5, and the video transmission device 6 are similar to those in the elevator monitoring apparatus 10 and 10A. The recorder 5 records both of the selling area image data and the cash register image data. In this Example, when the number of people in the selling area is small, the recording density d and the communication frequency e of the cash register image are increased for prevention of theft by a salesperson.

Meanwhile, there is also conceivable a configuration in which the determination unit 3 calculates the number of people and the degree of imbalance at the periphery of the cash register from the cash register image data. In this case, when the number of people around the cash register is small, the recording density d and the communication frequency e of the selling area image data are increased to easily record a criminal behavior that occurs in the store when the number of working salespeople is small.

Embodiment 3

FIG. 10 is a diagram for illustrating a monitoring apparatus according to Embodiment 3 of the present invention, and an object to be monitored by the monitoring apparatus. In FIG. 10, similarly to Embodiments 1 and 2, the elevator monitoring apparatus is given as an example of the monitoring apparatus, and as an example of the object to be monitored, the space in the elevator car 1 is given.

As illustrated in FIG. 10, the elevator monitoring apparatus 10B includes a monitoring camera 2, an adjustment unit 4A, a recorder 5, and a video transmission device 6.

The difference between Embodiment 1 and Embodiment 3 is described. In FIG. 10, the determination unit 3 of FIG. 1 is not provided. Further, in FIG. 10, the adjustment unit 4A is provided instead of the adjustment unit 4 of FIG. 1. The adjustment unit 4 and the adjustment unit 4A differ in operation.

To the adjustment unit 4A, movement path information k of the elevator car 1 is input from an elevator control panel provided outside of the elevator monitoring apparatus 10B. The movement path information k refers to information indicating a departure floor and a destination floor of the elevator car 1, or information indicating a distance or the number of floors between the departure floor and the destination floor. Further, the elevator control panel is a control device configured to control the running of the elevator car 1. The elevator control panel is installed at a machine room provided at an upper end of a hoistway in which the elevator car 1 ascends and descends. The adjustment unit 4A determines the recording density d and the communication frequency e based on the movement path information k. In Embodiment 3, when the movement path information k is equal to or larger than a fourth threshold value, the recording density d and the communication frequency e are determined to be set to the "high level". The reason is because, as the movement path is longer, that is, as the movement time is longer, it can be determined that the possibility that a dangerous phenomenon may occur is higher. Meanwhile, when the movement path information k is smaller than the fourth threshold value, that is, when the destination floor designated by the passenger is close to the departure floor, it is estimated that the possibility that a dangerous phenomenon is caused by the passenger is low, and hence the adjustment unit 4A determines to set the recording density d and the communication frequency e to the "low level".

Other configurations are the same as those in Embodiment 1 or 2, and hence description thereof is omitted here.

Now, a hardware configuration of the monitoring apparatus 10B is described. The monitoring apparatus 10B includes a camera, a processor, a memory, and a transmission device. The monitoring camera 2 is formed of the camera, for example, a video camera. The video transmission device 6 is formed of the transmission device. The transmission device includes a transmission interface, a transmission circuit, and a transmission antenna. The recorder 5 is formed of the memory. The memory includes a read only memory (ROM) and a random access memory (RAM). The adjustment unit 4A is formed of the processor and the memory. The adjustment unit 4A is implemented by the processor executing a program stored in the memory. Further, a plurality of processors and a plurality of memories may cooperate with each other to implement the functions of the adjustment unit 4A.

Next, an operation of the monitoring apparatus 10B according to Embodiment 3 of the present invention is described. FIG. 11 is a flow chart for illustrating the operation of the monitoring apparatus 10B.

As illustrated in FIG. 11, first, the monitoring camera 2 takes an image of the interior of the elevator car 1 to acquire the car interior image a, and outputs the result as the car interior image data b to the recorder 5 (Step S60).

Next, the adjustment unit 4A acquires the movement path information k from the outside (Step S61).

Next, the adjustment unit 4A determines, based on the movement path information k, the image quality and the frame rate to be used when the recorder 5 records the car interior image data b, and outputs the results as the recording density d to the recorder 5 (Step S62).

Next, the recorder 5 sets the values of the image quality and the frame rate based on the recording density d to record the car interior image data b acquired by the monitoring camera (Step S63).

Next, the adjustment unit 4A determines, based on the movement path information k, the image quality and the transmission frequency to be used when the video transmission device 6 transmits the car interior image data b to the outside, and outputs the results as the communication frequency e to the video transmission device 6 (Step S64).

Next, the video transmission device 6 sets the image quality and the transmission frequency based on the communication frequency e, and acquires the car interior image data b from the recorder 5 to transmit the car interior image data b to the outside, for example, the monitoring center (Step S65).

As described above, the monitoring apparatus according to Embodiment 3 of the present invention can adjust the recording density and the communication frequency of the car interior image data b acquired by the monitoring camera 2 in accordance with the movement path information of the elevator car 1.

In Step S62 described above, the adjustment unit 4A first calculates a scheduled movement time k' estimated from the movement path information k, and when the scheduled movement time k' is equal to or larger than a threshold value set in advance, the adjustment unit 4A determines to set the image quality for the recorder 5 to the "high level", and further determines to set the frame rate to the "high level". Meanwhile, when the scheduled movement time k' is smaller than the threshold value set in advance, the adjustment unit 4A determines to set the image quality for the recorder 5 to the "low level", and further determines to set the frame rate to the "low level". In this manner, the limited recording capacity of the recorder 5 can be effectively utilized. Each of the image quality and the frame rate may be changed at two stages of the "high level" and the "low level", but the importance may be ranked in accordance with the length of the scheduled movement time k' so that the change may be performed at a plurality of stages depending on the rank. When the importance is ranked, a look-up table in which a correspondence between the length of the scheduled movement time k' and the recording density d is defined in advance may be prepared so that the corresponding recording density d may be acquired from the look-up table based on the length of the scheduled movement time k'.

In Step S64 described above, the adjustment unit 4A determines to set the image quality for the video transmission device 6 to the "high level" and determines to set the transmission frequency to the "high level" when the scheduled movement time k' is equal to or larger than a threshold value set in advance. Meanwhile, when the scheduled movement time k' is smaller than the threshold value set in advance, the adjustment unit 4A determines to set the image quality for the video transmission device 6 to the "low level" and determines to set the transmission frequency to the "low level". As described above, the importance is determined based on the scheduled movement time k' of the elevator car 1, and the image quality and the transmission frequency are changed depending on the importance. In this manner, the entire amount of data to be transmitted to the outside can be reduced, and the communication cost can be decreased. Each of the image quality and the transmission frequency may be changed at two stages of the "high level" and the "low level", but the importance may be ranked so that the change may be performed at a plurality of stages depending on the rank. When the importance is ranked, a look-up table in which a correspondence between the length of the scheduled movement time k' and the communication frequency e is defined in advance may be prepared so that the corresponding communication frequency e may be acquired from the look-up table based on the length of the scheduled movement time k'.

It is also possible to execute only one of the calculation of the recording density d in Step S62 described above and the calculation of the communication frequency e in Step S64 described above. For example, when the recorder 5 has a plenty of recording capacity, the recording density d may be always set to the constant "high level" or "standard level", and only the communication frequency e may be controlled in accordance with the movement path information k.

Further, in the description above, the scheduled movement time k' is estimated from the movement path information k, but the present invention is not limited to this case, and a scheduled movement distance may be estimated so that the recording density d and the communication frequency e are determined based on the scheduled movement distance.

As described above, the monitoring apparatus according to Embodiment 3 of the present invention includes: the monitoring camera 2 serving as a second detection device configured to monitor a situation of a specific area in a moving object; the recorder 5 serving as a second recording device configured to record the monitoring information to be output from the second detection device; the video transmission device 6 serving as a second communication device configured to transmit the monitoring information recorded in the second recording device to the outside; and the adjustment unit 4A serving as a second adjustment unit, to which a scheduled movement time or a scheduled movement distance of the moving object is input from the outside, and is configured to adjust, based on the scheduled movement time or the scheduled movement distance, at least one of the recording density d to be used when the second recording device records the monitoring information or the communication frequency e to be used when the second communication device transmits the monitoring information. As described above, the monitoring apparatus according to Embodiment 3 adjusts the recording density d and the communication frequency e of the car interior image data b acquired by the monitoring camera 2 in accordance with the movement path information k of the elevator car 1. That is, the monitoring apparatus according to Embodiment 3 of the present invention determines the possibility that a dangerous phenomenon may occur to adjust the recording density d and the communication frequency e of image information in accordance with the possibility. In this manner the image data having high importance is recorded at a high image quality and a high frame rate, and is transmitted at a high image quality and a high transmission frequency. Meanwhile, the image data having low importance is recorded at a low image quality and a low frame rate, and is transmitted at a low image quality and a low transmission frequency. In this manner, the image data having high importance can be ensured to be recorded and transmitted at a high quality. Further, for the image data having low importance, the recording density and the transmission frequency can be suppressed to be low, and thus the amount of data can be reduced as a whole. Further, in Embodiment 3, the possibility that a dangerous phenomenon may occur is determined based on the movement path information of the elevator car 1, and hence it is determined that the possibility that a dangerous phenomenon may occur in the space is high when the movement path is long. Therefore, a dangerous action in a group, which has not been detected in Patent Literature 2 described above, can also be detected.

In Embodiment 3 above, description has been given of Example in which the monitoring apparatus is the "elevator monitoring apparatus" and the object to be monitored is the "space in the elevator car". In the following, description is given of other Examples of the monitoring apparatus according to Embodiment 3 described above.

<Example of Moving Vehicle Monitoring Apparatus>

As other Example in Embodiment 3 described above, there is conceivable Example in which the monitoring apparatus is a "moving vehicle monitoring apparatus". In this Example, the object to be monitored is an "interior of a vehicle" that is moving. As an example of the vehicle that is moving, there can be given a taxi or a bus, for example. In this Example, the moving vehicle monitoring apparatus monitors the interior of the vehicle. In the "moving vehicle monitoring apparatus", other configurations are similar to those of the elevator monitoring apparatus 10B. That is, the "moving vehicle monitoring apparatus" includes the monitoring camera 2, the adjustment unit 4A, the recorder 5, and the video transmission device 6. Further, the operation in this Example is similar to that in the elevator monitoring apparatus 10B except that the object to be monitored is the "interior of the vehicle". That is, the operations of the monitoring camera 2, the recorder 5, and the video transmission device 6 are similar to those in the elevator monitoring apparatus 10B. The adjustment unit 4A receives coordinates of a vehicle starting point and coordinates of a target point as the movement path information k to calculate the scheduled movement time k'. Similarly to the case of the elevator monitoring apparatus 10B, the adjustment unit 4A sets a high recording density d for the recorder 5 and sets a high communication frequency e for the video transmission device 6 when the scheduled movement time k' is larger than the threshold value. In this manner, while the interior of the moving vehicle is monitored, the image can be recorded and transmitted more efficiently.

<Example of Ship Monitoring Apparatus>

As other Example in Embodiment 3 described above, there is conceivable Example in which the monitoring apparatus is a "ship monitoring apparatus". In this Example, the object to be monitored is an "interior of a ship". In this Example, the ship monitoring apparatus monitors the interior of the ship. In the "ship monitoring apparatus", other configurations are similar to those of the elevator monitoring apparatus 10B. That is, the "ship monitoring apparatus" includes the monitoring camera 2, the adjustment unit 4A, the recorder 5, and the video transmission device 6. Further, the operation in this Example is similar to that in the elevator monitoring apparatus 10B except that the object to be monitored is the "interior of the ship". That is, the operations of the monitoring camera 2, the recorder 5, and the video transmission device 6 are similar to those in the elevator monitoring apparatus 10B. The adjustment unit 4A receives coordinates of a vehicle starting point and coordinates of a target point as the movement path information k to calculate the scheduled movement time k'. Similarly to the case of the elevator monitoring apparatus 10B, the adjustment unit 4A sets a high recording density d for the recorder 5 and sets a high communication frequency e for the video transmission device 6 when the scheduled movement time k' is larger than the threshold value. In this manner, while the interior of the moving ship is monitored, the image can be recorded and transmitted more efficiently.

The ship monitoring apparatus includes the monitoring camera 2, the adjustment unit 4A, the recorder 5, and the video transmission device 6. The operations of the monitoring camera 2, the adjustment unit 4, the recorder 5, and the video transmission device 6 are similar to those in the vehicle monitoring apparatus 10B. In this manner, while the interior of the moving ship is monitored, the image can be recorded and transmitted more efficiently.

The invention claimed is:

1. A monitoring apparatus, comprising:
   first detection circuitry configured to monitor a situation of an elevator;
   first recording circuitry configured to record monitoring information to be output from the first detection circuitry;
   first communication circuitry configured to transmit the monitoring information recorded in the first recording circuitry to an outside monitoring center;
   first determination circuitry configured to calculate a number of people present in the elevator and a degree of positional imbalance of the people based on the monitoring information to be output from the first detection circuitry, the positional imbalance corresponding to a position of the people in the elevator with regard to an empty floor space in the elevator; and
   first adjusting circuitry configured to adjust, based on the number of people and the degree of positional imbalance that are calculated by the first determination circuitry, at least one of a recording density to be used when the first recording circuitry records the monitoring information or a communication frequency to be used when the first communication circuitry transmits the monitoring information.

2. The monitoring apparatus according to claim 1, wherein the first adjusting circuitry is configured to:
when the number of people calculated by the first determination circuitry is equal to or smaller than a first threshold value, or
when the number of people calculated by the first determination circuitry is equal to or larger than a second threshold value that is larger than the first threshold value, and the degree of positional imbalance calculated by the first determination circuitry is equal to or larger than a third threshold value,
set a level of the at least one of the recording density or the communication frequency to a first level; and
set, in other cases, the level of the at least one of the recording density or the communication frequency to a second level lower than the first level.

3. The monitoring apparatus according to claim 1, wherein the first detection circuitry includes a monitoring camera configured to take an image of the elevator.

4. The monitoring apparatus according to claim 3, wherein the first determination circuitry is configured to:
obtain a difference between image data taken by the monitoring camera and background image data of the elevator in a state in which no person is present;
extract a person region in which a person is present in the elevator based on the difference;
calculate an area of the person region included in each block obtained by dividing the image of the elevator;
calculate a reciprocal of dispersion of the area; and
output the reciprocal as the degree of positional imbalance.

5. The monitoring apparatus according to claim 1, wherein the first detection circuitry includes:
a monitoring camera configured to take an image of the elevator; and
a load sensor configured to detect a load in the elevator.

6. The monitoring apparatus according to claim 5, wherein the first determination circuitry is configured to:
extract a person region in which a person is present in the elevator based on a result of detection by the load sensor;
calculate an area of the person region included in each block obtained by dividing the image of the elevator;
calculate a reciprocal of dispersion of the area; and
output the reciprocal as the degree of positional imbalance.

7. The monitoring apparatus according to claim 1, wherein when the number of people in a space to be monitored is less than a predetermined threshold, or when the number of people is greater than a predetermined threshold and a positional imbalance among the people is greater than a predetermined threshold, it is determined that a possibility of occurrence of a dangerous phenomenon in the space is increased and a recording density and a communication frequency of information are increased.

8. The monitoring apparatus according to claim 1, wherein the recording density is a recorded image quality and a recorded frame rate.

9. A monitoring apparatus, comprising:
first detection circuitry configured to monitor a situation of a specific area;
first recording circuitry configured to record monitoring information to be output from the first detection circuitry;
first communication circuitry configured to transmit the monitoring information recorded in the first recording circuitry to an outside monitoring center;
first determination circuitry configured to calculate a number of people present in the specific area and a degree of positional imbalance of the people based on the monitoring information to be output from the first detection circuitry; and
first adjusting circuitry configured to adjust, based on the number of people and the degree of positional imbalance that are calculated by the first determination circuitry, at least one of a recording density to be used when the first recording circuitry records the monitoring information or a communication frequency to be used when the first communication circuitry transmits the monitoring information, wherein
the first adjusting circuitry is configured to:
when the number of people calculated by the first determination circuitry is equal to or smaller than a first threshold value, or
when the number of people calculated by the first determination circuitry is equal to or larger than a second threshold value that is larger than the first threshold value, and the degree of positional imbalance calculated by the first determination circuitry is equal to or larger than a third threshold value,
set a level of the at least one of the recording density or the communication frequency to a first level; and
set, in other cases, the level of the at least one of the recording density or the communication frequency to a second level lower than the first level.

* * * * *